United States Patent
Saha et al.

(10) Patent No.: US 8,281,886 B2
(45) Date of Patent: Oct. 9, 2012

(54) ELECTRIC MOTOR CONTROL DEVICE, DRIVE DEVICE AND HYBRID DRIVE DEVICE

(75) Inventors: Subrata Saha, Anjo (JP); Takashi Yoshida, Anjo (JP); Daisuke Ogino, Anjo (JP); Jin Izawa, Obu (JP); Yoshinori Oono, Nukata-gun (JP)

(73) Assignee: Aisin AW Co., Ltd., Anjo (JP)

( * ) Notice: Subject to any disclaimer, the term of this patent is extended or adjusted under 35 U.S.C. 154(b) by 466 days.

(21) Appl. No.: 12/733,176

(22) PCT Filed: Oct. 31, 2008

(86) PCT No.: PCT/JP2008/069857
§ 371 (c)(1),
(2), (4) Date: Feb. 16, 2010

(87) PCT Pub. No.: WO2009/057741
PCT Pub. Date: May 7, 2009

(65) Prior Publication Data
US 2010/0140003 A1    Jun. 10, 2010

(30) Foreign Application Priority Data
Nov. 1, 2007  (JP) .................................. 2007-285255

(51) Int. Cl.
*B60W 10/08* (2006.01)
(52) U.S. Cl. ..................... 180/65.285; 903/930; 318/811
(58) Field of Classification Search ............... 180/65.21, 180/65.265, 65.275, 65.285, 65.8; 903/930; 318/808, 810, 811, 812
See application file for complete search history.

(56) References Cited

U.S. PATENT DOCUMENTS

| 5,883,484 | A | 3/1999 | Akao |
| 6,984,948 | B2 * | 1/2006 | Nakata et al. ............ 318/400.02 |
| 7,723,946 | B2 * | 5/2010 | Welchko et al. ............... 318/811 |
| 7,960,930 | B2 * | 6/2011 | Sato .............................. 318/432 |
| 2004/0130918 | A1 | 7/2004 | Ho |

FOREIGN PATENT DOCUMENTS

| JP | A 10-066383 | 3/1998 |
| JP | A 2003-033071 | 1/2003 |
| JP | A 2005-210772 | 8/2005 |

(Continued)

OTHER PUBLICATIONS

Masaki Okamura et al.; "Development of Hybrid Electric Drive System Using a Boost Converter", EVS20, Nov. 2003, Toyota Motor Corporation, Toyota, Japan.

(Continued)

*Primary Examiner* — John Walters
(74) *Attorney, Agent, or Firm* — Oliff & Berridge, PLC (57) ABSTRACT

An electric motor control device includes an inverter that supplies an output of a primary-side DC power supply to an electric motor to control driving of the electric motor; a converter that includes a voltage increasing power supply device that increases a voltage of the primary-side DC power supply to supply the inverter with the increased voltage as a secondary voltage, and a regenerative power supply device that reversely supplies regenerative power from the inverter to the primary-side DC power supply; a secondary-side target voltage determination unit; a converter control unit; and an electric motor control unit.

26 Claims, 5 Drawing Sheets

FOREIGN PATENT DOCUMENTS

| | | |
|---|---|---|
| JP | A 2006-20399 | 1/2006 |
| JP | A 2006-42482 | 2/2006 |
| JP | B2 3746334 | 2/2006 |
| JP | A 2006-204050 | 8/2006 |
| JP | A 2007-259538 | 10/2007 |

OTHER PUBLICATIONS

Translation of Jun. 6, 2011 Office Action issued in Korean Patent Application No. 10-2009-7027144.
International Search Report mailed Jan. 27, 2009 for PCT/JP2008/069857 (with English-language translation).

* cited by examiner

ELECTRIC MOTOR CONTROL DEVICE, DRIVE DEVICE AND HYBRID DRIVE DEVICE

INCORPORATION BY REFERENCE

This application is the U.S. National Phase of PCT/JP2008/069857 filed on Oct. 31, 2008, which claims priority from Japanese Patent Application No. 2007-285255 filed on Nov. 1, 2007, the specification, drawings and abstract of which are incorporated herein by reference in their entirety.

BACKGROUND

The present invention relates to an electric motor control device that controls power supplied from an inverter to an electric motor and regenerative power supplied in the opposite direction, and in particular to control of an operating voltage supplied from an inverter to an electric motor and a voltage control mode. The electric motor control device according to the present invention may be used, for example, in an electric vehicle (EV) that drives wheels with the electric motor, and in a hybrid electric vehicle (HEV) that includes, in addition to the electric motor, a fuel engine and a generator (occasionally referred to as electric motor or dynamotor) rotationally driven by the engine.

As the rotation speed of an electric motor increases, a counter electromotive force generated in a stator coil increases. This makes it increasingly difficult to supply a target current from an inverter to the stator coil, and hinders obtaining a target torque output. In this case, it is possible to output the target torque at a higher rotation speed by reducing a d-axis current id and a q-axis current iq which have been calculated to achieve the given motor target torque, although the efficiency of power use reduces. Such control is referred to as field weakening control.

Japanese Patent Application Publication No. JP-A-H10-66383 discloses a motor drive control device that does not utilize field weakening control to avoid a power loss and a reduction in the system efficiency due to field weakening control. The motor drive control device includes a voltage increasing circuit that increases the operating voltage applied to an inverter. Power is supplied from the voltage increasing circuit to the inverter in the case where the battery voltage is short for a target operation of a motor. Japanese Patent No. JP-B-3746334 discloses a motor drive control device including a circuit that increases the battery voltage. The motor drive control device calculates an increased voltage required for the target operation and the speed electromotive force of a motor to control the voltage increasing circuit so as to achieve the calculated increased voltage. Japanese Patent Application Publication No. JP-A-2005-210772 discloses a motor drive control device that controls an inverter and a voltage increasing circuit so as to achieve such a field weakening current and a voltage increase ratio that minimize the sum of a field weakening loss and a voltage increase loss in a region in which the target rotation speed exceeds a base rotation speed Rb. Japanese Patent Application Publication No. JP-A-2003-33071 discloses a motor control device that detects each of the power loss of a converter which serves as a voltage increasing circuit and the power loss of an inverter. The motor control device controls the converter and the inverter such that the detected power losses balance each other only in a field weakening control region, and controls the current such that the motor drive voltage is in a predetermined range outside the field weakening control region.

In an electric vehicle (EV) or a hybrid electric vehicle (HEV) having a voltage increasing function according to the related art, for example, the DC link voltage (a voltage after being increased by a converter: the secondary voltage of the converter) applied to an inverter which drives an electric motor is determined, in accordance with the target torque and the rotation speed of an electric motor, to be three-phase PWM (SVpwm) or two-phase PWM (Dpwm) in a region in which a field weakening current is not required, and to be 0 (with the modulation ratio Mi being constant at 0.707 and with the voltage control mode being Dpwm) in a region in which a field weakening current is required, in order to reduce a power loss due to the field weakening current. For example, in the case of a constant torque, the secondary-side target voltage Vuc* is determined such that the DC link voltage increases at a constant rate to reach an upper limit Vmax along with an increase in the rotation speed was shown in FIG. 6. After the DC link voltage reaches the upper limit Vmax, it is conceivable to perform field weakening control, and then to switch the voltage control mode from Dpwm to a one-pulse mode in which rectangular-wave power is applied to all the phases.

SUMMARY

In the modes for determining the DC link voltage according to the related art described above, SVpwm and Dpwm are occasionally used even in a region in which the rotation speed of an electric motor is high, and as a result losses may not be reduced.

It is an object of the present invention to reduce a power loss during high-speed rotation of an electric motor.

In order to achieve the foregoing object, according to the present invention, a secondary-side target voltage, which sets a secondary voltage to be applied to an inverter, is determined such that an electric motor is driven on the basis of one of a first region in a modulation mode in which PWM power is applied to at least two phases and in which field weakening control is not performed, a third region in a modulation mode in which PWM power at a voltage lower than a maximum voltage (Vmax) of a converter is applied to at least two phases and in which field weakening control is performed, and a second region (FIG. 4) in a one-pulse mode in which rectangular-wave power at a voltage lower than the maximum voltage of the converter is applied to all the phases and in which field weakening control is performed. This is achieved by an electric motor control device according to a first aspect of the present invention described in (1) below.

(1) An electric motor control device includes: an inverter that supplies an output of a primary-side DC power supply to an electric motor to control driving of the electric motor; a converter that includes a voltage increasing power supply device that increases a voltage of the primary-side DC power supply to a secondary voltage to supply the secondary voltage to the inverter, and a regenerative power supply device that reversely supplies regenerative power from the inverter to the primary-side DC power supply; secondary-side target voltage determination means for determining a secondary-side target voltage such that the electric motor is driven on the basis of one of a first region in a modulation mode in which PWM power is applied to at least two phases and in which field weakening control is not performed, a third region in a modulation mode in which PWM power at a voltage lower than a maximum voltage of the converter is applied to at least two phases and in which field weakening control is performed, and a second region in a one-pulse mode in which rectangular-wave power at a voltage lower than the maximum voltage of the converter is applied to all phases and in which field weakening control is performed; converter control means for controlling the voltage increasing power supply means and the regenerative power supply means of the converter such that the secondary voltage becomes the secondary-side target voltage; and electric motor control means for controlling the inverter on the basis of a target torque and a rotation speed of the electric motor and the secondary voltage such that an output torque of the electric motor becomes the target torque.

According to the above aspect, the one-pulse mode region in which the voltage control mode is the one-pulse mode can be enhanced by interposing the third region. The switching loss of the inverter is small in the one-pulse mode. Therefore, the power loss in a high rotation speed region can be significantly reduced by enhancing the one-pulse mode. The application of the one-pulse mode also suppresses generation of an eddy current, which results in a reduction in the iron loss.

(2) In the electric motor control device according to (1) above, the secondary-side target voltage determination means increases the secondary-side target voltage in accordance with an increase in the target torque of the electric motor in the second region.

(3) In the electric motor control device according to (1) or (2) above, the secondary-side target voltage determination means determines the secondary-side target voltage on the basis of secondary-side target voltage characteristics for each target torque of the electric motor in which the secondary-side target voltage increases with a first gradient in accordance with an increase in the rotation speed of the electric motor in the first region, increases with a third gradient different from the first gradient in the third region at the rotation speed of the electric motor equal to or higher than a first rotation speed at which field weakening control of the electric motor is started, and increases with a second gradient different from the third gradient in the second region at which the rotation speed of the electric motor equal to or higher than a second rotation speed at which the modulation mode is switched to the one-pulse mode.

In order to achieve the foregoing object, in the present invention, a secondary-side target voltage corresponding to the rotation speed of an electric motor is derived using secondary-side target voltage characteristics assigned to the target torque of the electric motor in which the secondary-side target voltage increases with a steep first gradient in accordance with an increase in the rotation speed in a modulation mode in which PWM power is applied to at least two phases, is switched to increase with a gentle third gradient at a first rotation speed at which field weakening control is started, and is switched to increase with a second gradient different from the third gradient at a second rotation speed at which the modulation mode is switched to a one-pulse mode in which rectangular-wave power is applied to all the phases. That is, unlike secondary-side target voltage characteristics according to the related art in which the secondary-side target voltage increases with a constant steep gradient in accordance with an increase in the rotation speed at the same target torque, in the secondary-side target voltage characteristics of the present invention, the secondary-side target voltage is switched to increase with the gentle third gradient generally at a rotation speed at which field weakening control is started, and is switched to increase with the second gradient for the one-pulse mode generally at a rotation speed at which the voltage control mode is switched to the one-pulse mode. This is achieved by an electric motor control device according to a second aspect of the present invention described in (4) below.

(4) An electric motor control device includes: an inverter that supplies an output of a primary-side DC power supply to an electric motor to control driving of the electric motor; a converter that includes a voltage increasing power supply device that increases a voltage of the primary-side DC power supply to supply the inverter with the increased voltage as a secondary voltage, and a regenerative power supply device that reduces a voltage of regenerative power from the inverter to reversely supply the reduced voltage to the primary-side DC power supply; secondary-side target voltage determination means for deriving a secondary-side target voltage on the basis of secondary-side target voltage characteristics for each target torque of the electric motor in which the secondary-side target voltage increases with a first gradient in accordance with an increase in a rotation speed of the electric motor in a modulation mode in which PWM power is applied to at least two phases, is switched to increase with a third gradient different from the first gradient at a first rotation speed at which field weakening control is started, and is switched to increase with a second gradient different from the third gradient at a second rotation speed at which the modulation mode is switched to a one-pulse mode in which rectangular-wave power is applied to all phases, up to a maximum voltage of the converter; converter control means for controlling the voltage increasing power supply means and the regenerative power supply means of the converter such that the secondary voltage becomes the secondary-side target voltage; and electric motor control means for controlling the inverter on the basis of the target torque and the rotation speed of the electric motor and the secondary-side target voltage such that an output torque of the electric motor becomes the target torque.

According to the above aspect, the one-pulse mode region can be enhanced by interposing the secondary-side target voltage region with the third gradient. The switching loss of the inverter is small in the one-pulse mode. Therefore, the power loss in a high rotation speed region can be significantly reduced by enhancing the one-pulse mode. The application of the one-pulse mode also suppresses generation of an eddy current, which results in a reduction in the iron loss.

According to the embodiment of the present invention discussed below, the first gradient before field weakening control is started is larger than the second gradient in the one-pulse mode, which in turn is larger than the third gradient after field weakening control is started. With this configuration, the PWM control region with a relatively small field weakening current value is enhanced, and the region in the one-pulse mode is also increased. Consequently, the power loss of the inverter is suppressed effectively in a wide rotation speed range.

(5) In the electric motor control device according to (3) or (4) above, the first gradient is larger than the third gradient, and the second gradient is larger than the third gradient; and the second gradient is steeper than the third gradient.

(6) In the electric motor control device according to any one of (3) to (5) above, the second gradient is smaller than the first gradient.

(7) In the electric motor control device according to any one of (3) to (6) above, the electric motor control means switches the modulation mode to two-phase modulation in a speed region with the third gradient.

(8) In the electric motor control device according to any one of (3) to (7) above, the secondary-side target voltage increases as the target torque is larger in the secondary-side target voltage characteristics.

(9) In the electric motor control device according to any one of (3) to (8) above, the third gradient is larger as the target torque is larger.

(10) In the electric motor control device according to any one of (3) to (9) above, the first gradient is determined on the basis of a modulation ratio, which is a ratio of the target voltage of the electric motor to the secondary voltage of the converter during three-phase modulation or two-phase modulation before field weakening control is started.

(11) In the electric motor control device according to (10) above, the second gradient is determined on the basis of a modulation ratio, which is a ratio of the target voltage of the electric motor to the secondary voltage of the converter in the one-pulse modulation mode.

(12) In the electric motor control device according to (11) above, the modulation ratio which is the ratio of the target voltage of the electric motor to the secondary voltage of the converter during the three-phase modulation or the two-phase modulation is smaller than the modulation ratio which is the ratio of the electric motor target voltage to the secondary voltage of the converter.

(13) In the electric motor control device according to (4) above, with the third gradient, the secondary voltage target value assigned to the first rotation speed is increased to the secondary-side target voltage assigned to the second rotation speed in correspondence with a speed increase from the first rotation speed to the second rotation speed at the same target torque.

(14) In the electric motor control device according to (4) above, the secondary-side target voltage characteristics for power running and the secondary-side target voltage characteristics for regeneration are provided for the same target torque; and the secondary-side target voltage determination means determines which of "power running" and "regeneration" is to be performed on the basis of the target torque and the rotation speed to derive the secondary-side target voltage corresponding to the rotation speed of the electric motor on the basis of the secondary-side target voltage characteristics for power running in the case where it is determined that "power running" is to be performed and on the basis of the secondary-side target voltage characteristics for regeneration in the case where it is determined that "regeneration" is to be performed.

(15) A drive device includes: the electric motor control device according to any one of to above; and an electric motor to which power is supplied by the inverter of the electric motor control device, and which drives wheels.

(16) A hybrid drive device includes: a first electric motor that drives wheels; a second electric motor rotationally driven by a fuel engine; a first inverter that supplies an output of a primary-side DC power supply to the first electric motor to control driving of the first electric motor; a second inverter that supplies the output of the primary-side DC power supply to the second electric motor to control driving of the second electric motor; a converter that includes a voltage increasing power supply device that increases a voltage of power of the primary-side DC power supply to supply the first and second inverters with the increased voltage, and a regenerative power supply device that reversely supplies regenerative power from the first and second inverters to the primary-side DC power supply; first secondary-side target voltage determination means for determining a first secondary-side target voltage such that the first electric motor is driven on the basis of one of a first region in a modulation mode in which PWM power is applied to at least two phases and in which field weakening control is not performed, a third region in a modulation mode in which PWM power at a voltage lower than a maximum voltage of the converter is applied to at least two phases and in which field weakening control is performed, and a second region in a one-pulse mode in which rectangular-wave power at a voltage lower than the maximum voltage of the converter is applied to all phases and in which field weakening control is performed; second secondary-side target voltage determination means for deriving the second secondary-side target voltage suitable for an efficient operation of the second electric motor, in accordance with a target torque and a rotation speed of the second electric motor; converter control means for controlling the voltage increasing power supply means and the regenerative power supply means of the converter such that a secondary voltage supplied to the first and second inverters by the converter becomes a higher one of the first secondary-side target voltage and the second secondary-side target voltage; first motor control means for controlling the first inverter on the basis of a target torque and a rotation speed of the first electric motor and the secondary voltage such that an output torque of the first electric motor becomes the target torque; and second motor control means for controlling the second inverter on the basis of the target torque and the rotation speed of the second electric motor and the secondary voltage such that an output torque of the second electric motor becomes the target torque.

(17) A hybrid drive device includes: a first electric motor that drives wheels; a second electric motor rotationally driven by a fuel engine; a primary-side DC power supply; a first inverter that supplies an output of a primary-side DC power supply to the first electric motor to control driving of the first electric motor; a second inverter that supplies the output of the primary-side DC power supply to the second electric motor to control driving of the second electric motor; a converter that includes a voltage increasing power supply device that increases a voltage of power of the primary-side DC power supply to supply the first and second inverters with the increased voltage, and a regenerative power supply device that reversely supplies regenerative power from the first and second inverters to the primary-side DC power supply; first secondary-side target voltage determination means for deriving a first secondary-side target voltage on the basis of secondary-side target voltage characteristics for each target torque of the first electric motor in which the secondary-side target voltage increases with a first gradient in accordance with an increase in a rotation speed of the first electric motor in a modulation mode in which PWM power is applied to at least two phases, is switched to increase with a third gradient smaller than the first gradient at a first rotation speed at which field weakening control is started, and is switched to increase with a second gradient larger than the third gradient at a second rotation speed at which the modulation mode is switched to a one-pulse mode in which rectangular-wave power is applied to all phases, up to a maximum voltage of the converter; second secondary-side target voltage determination means for deriving the second secondary-side target voltage suitable for an efficient operation of the second electric motor, in accordance with a target torque and a rotation speed of the second electric motor; converter control means for controlling the voltage increasing power supply means and the regenerative power supply means of the converter such that a secondary voltage supplied to the first and second inverters by the converter becomes a higher one of the first secondary-side target voltage and the second secondary-side target voltage; first motor control means for controlling the first inverter on the basis of the target torque and the rotation speed of the first electric motor and the secondary voltage such that an output torque of the first electric motor becomes the target torque; and second motor control means for controlling the second inverter on the basis of the target torque and the rotation speed of the second electric motor and the secondary voltage such that an output torque of the second electric motor becomes the target torque.

DETAILED DESCRIPTION OF EMBODIMENTS

Other objects and characteristics of the present invention will become apparent from an embodiment described below with reference to the accompanying drawings.

First Embodiment

Figure 1:
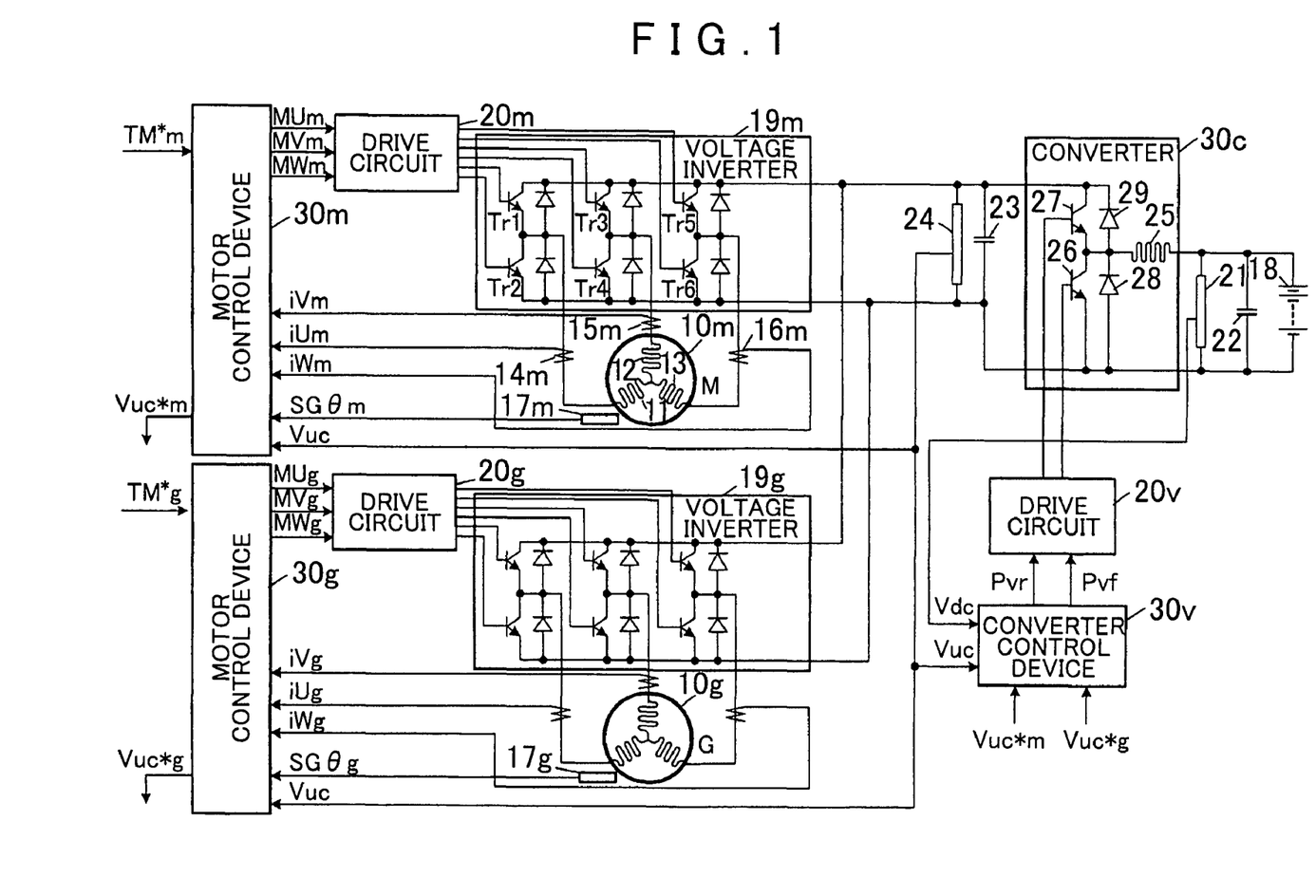
FIG. 1 is a block diagram showing a schematic configuration of a first embodiment of the present invention.

FIG. 1 shows an outline of a first embodiment of the present invention. In this embodiment, an electric motor 10m to be controlled is a permanent-magnet synchronous electric motor installed in a vehicle to rotationally drive wheels. The electric motor 10m includes a rotor having a built-in permanent magnet, and a stator having three-phase coils 11 to 13 for U-phase, V-phase, and W-phase. A voltage inverter 19m supplies power from an on-vehicle battery 18 to the electric motor 10m. A rotor of a resolver 17m is coupled to the rotor of the electric motor 10m. The resolver 17m detects the magnetic pole position of the rotor of the electric motor 10m. The resolver 17m generates an analog voltage (rotation angle signal) SGθm representing the rotation angle of the rotor of the electric motor 10m, and provides the generated signal to a motor control device 30m.

The battery 18 is an accumulator battery in the vehicle. A primary-side condenser 22 is connected to the battery 18 when an electrical system in the vehicle is turned on to form a primary-side DC power supply together with the battery 18. A voltage sensor 21 provides a voltage detection signal Vdc representing the voltage of the primary-side condenser 22 (voltage of the on-vehicle battery 18) to a converter control device 30v. In this embodiment, a voltage dividing resistance is used in the voltage sensor 21. One end of a reactor 25 of a converter 30c is connected to the positive electrode (+ line) of the primary-side DC power supply.

The converter 30c further includes a voltage increasing semiconductor switch 26 which is a voltage increasing switching element that turns on and off between the other end of the reactor 25 and the negative electrode (- line) of the primary-side DC power supply, a regeneration semiconductor switch 27 which is a voltage-reducing switching element that turns on and off between the positive electrode of a secondary-side condenser 23 and the other end of the reactor 25, and diodes 28, 29 that are respectively connected in parallel to the semiconductor switches 26, 27.

When the voltage increasing semiconductor switch 26 is turned on (conductive), a current flows from the primary-side DC power supply (18, 22) to the switch 26 via the reactor 25. This allows the reactor 25 to accumulate power. When the switch 26 is turned off (non-conductive), the reactor 25 discharges a high voltage to the secondary-side condenser 23 through the diode 25. That is, a voltage higher than the voltage of the primary-side DC power supply is induced to charge the secondary-side condenser 23. Repeatedly turning on and off the switch 26 allows continuous high-voltage charging of the secondary-side condenser 23. That is, the secondary-side condenser 23 is charged at a high voltage. Repeatedly turning on and off the switch 26 in regular cycles increases power accumulated in the reactor 25 in accordance with the length of on periods. Therefore, the rate of power supply from the primary-side DC power supply 18, 22 to the secondary-side condenser 23 via the converter 30c (the rate of power supply for power running) can be adjusted by adjusting an on time in a regular cycle (on-duty: ratio of the length of an on time to the length of a regular cycle), that is, by performing PWM control.

When the regeneration semiconductor switch 27 is turned on (conductive), power accumulated in the secondary-side condenser 23 is provided to the primary-side DC power supply 18, 22 through the switch 27 and the reactor 25 (reverse power supply: regeneration). Also in this case, the rate of reverse power supply from the secondary-side condenser 23 to the primary-side DC power supply 18, 22 via the converter 30c (the rate of power supply for regeneration) can be adjusted by adjusting an on time of the switch 27 in a regular cycle, that is, by performing PWM control.

The voltage inverter 19m includes six switching transistors Tr1 to Tr6. The transistors Tr1 to Tr6 are respectively driven on (conductive) in response to six parallel drive signals generated by a drive circuit 20m. The DC voltage of the secondary-side condenser 23 (the output voltage, i.e. the secondary voltage, of the converter 30c) is converted into three AC voltages with a phase difference of $2\pi/3$, that is, a three-phase AC voltage. The three AC voltages are respectively applied to the three-phase (U-phase, V-phase, W-phase) stator coils 11 to 13 of the electric motor 10m. This allows phase currents iUm, iVm, iWm to flow through the stator coils 11 to 13 of the electric motor 10m to rotate the rotor of the electric motor 10m. In order to increase the power supply capacity for on/off driving (switching) of the transistors Tr1 to Tr6 with PWM pulses and suppress voltage surges, the secondary-side condenser 23 with a high capacity is connected to the secondary-side output line of the converter 30c, which is the input line of the inverter 19m. On the contrary, the primary-side condenser 22 forming the primary-side DC power supply is small, low-cost, and low-capacity. The capacity of the primary-side condenser 22 is considerably smaller than the capacity of the secondary-side condenser 23. The voltage sensor 24 detects a secondary voltage Vuc of the converter 30c to provide the detected voltage to the converter control device 30v. Current sensors 14m to 16m which each use a hall IC are respectively mounted in power supply lines connected to the stator coils 11 to 13 of the electric motor 10m. The current sensors 14m to 16m respectively detect the phase currents iUm, iVm, iWm to generate a current detection signal (analog voltage), and provides the generated current detection signal to the motor control device 30m.

Figure 2:
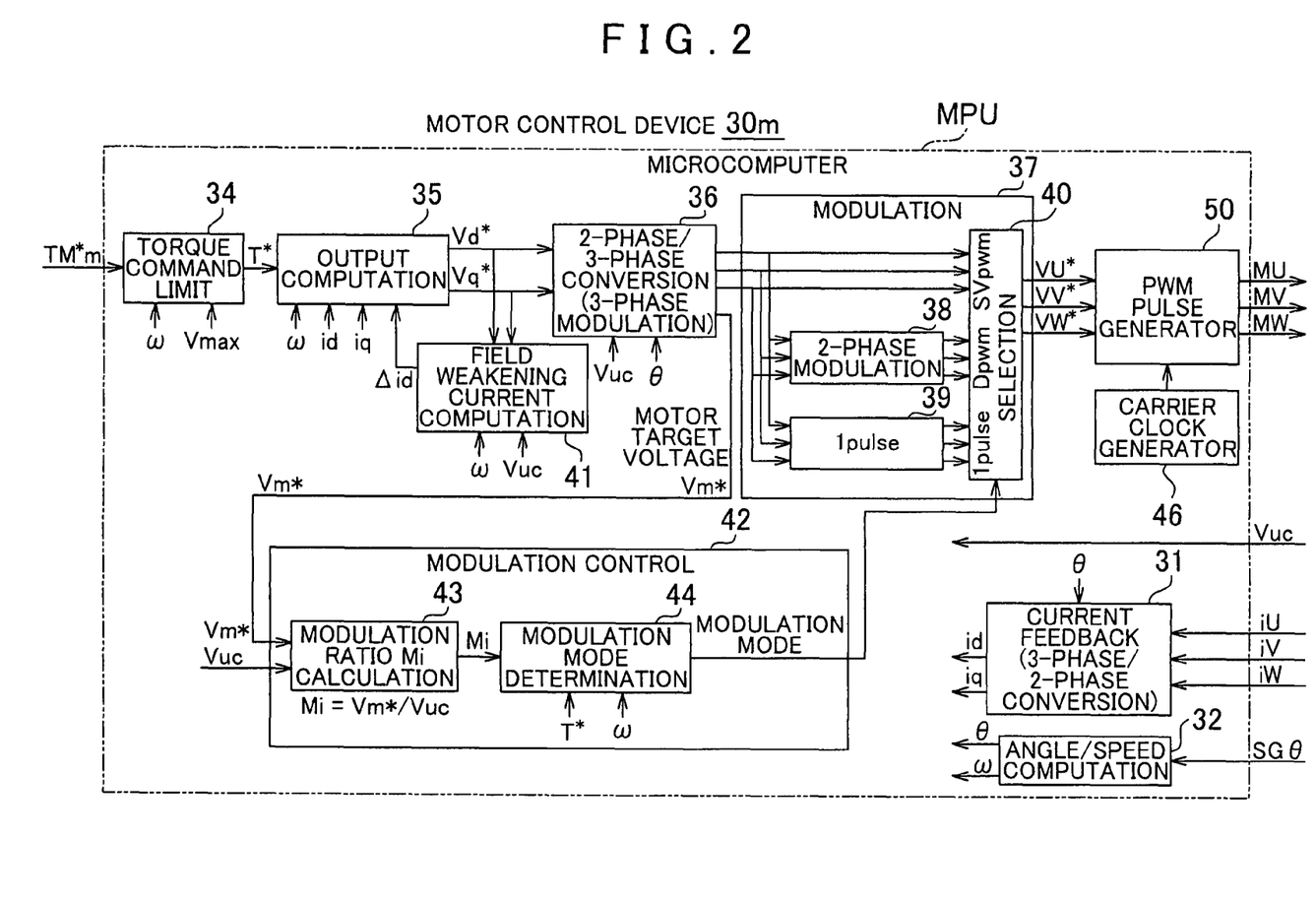
FIG. 2 is a block diagram showing a schematic functional configuration of a motor control device 30m shown in FIG. 1.

FIG. 2 shows a functional configuration of the motor control device 30m. In this embodiment, the motor control device 30m is an electronic control unit that includes a microcomputer MPU as its main component. The motor control device 30m also includes interfaces (signal processing circuits, not shown) between the microcomputer MPU and the drive circuit 20m, the current sensors 14m to 16m, the resolver 17m, the primary voltage sensor 21, and the secondary voltage sensor 24, and further includes interfaces (communication circuits, not shown) between the microcomputer and a main controller of a vehicle running control system (not shown) in the vehicle.

With reference to FIG. 2, the microcomputer in the motor control device 30m calculates a rotation angle (magnetic pole position) θm and a rotation speed (angular speed) ωm of the rotor of the electric motor 10m on the basis of the rotation angle signal SGθm provided by the resolver 17m.

To be more precise, the rotation angle and the magnetic pole position of the rotor of the electric motor 10m are not the same as each other; however, the rotation angle and the magnetic pole position are proportional to each other with a proportionality coefficient set by the number p of magnetic poles of the electric motor 10m. The rotation speed and the angular speed are also not the same as each other; however, the rotation speed and the angular speed are also proportional to each other with a proportionality coefficient set by the number p of magnetic poles of the electric motor 10m. Herein, the rotation angle θm refers to the magnetic pole position. The rotation speed ωm refers to the angular speed, but occasionally refers to the rotation speed.

The main controller of the vehicle running control system (not shown) provides a motor target torque TM*m to the microcomputer of the motor control device 30m. The main controller calculates a vehicle required torque TO* m on the basis of the vehicle speed and the accelerator operation amount, and generates the motor target torque TM*m in correspondence with the vehicle required torque TO*m to provide the generated motor target torque TM*m to the microcomputer MPU. The microcomputer MPU outputs a rotation speed ω [rpm] of the electric motor 10m to the main controller.

In the microcomputer MPU of the motor control device 30m, torque command limit 34 reads out from a limit torque table (look-up table) a limit torque TM*mmax corresponding to an upper limit Vmax of the secondary voltage and the rotation speed ω. If the target torque TM* m is more than TM*mmax, TM*mmax is set as a target torque T*. If the target torque TM*m is equal to or less than TM*mmax, the motor target torque TM*m is set as the target torque T*. The motor target torque T* generated with application of such a limitation is provided to output computation 35.

The limit torque table is a memory region in which various voltage values in the range of the upper limit Vmax of the secondary voltage and the rotation speed are used as addresses, and the maximum torque that can be generated by the electric motor 10m at each voltage value is written as a limit torque TM*mmax. In this embodiment, the limit torque table refers to a memory region of a RAM (not shown) in the microcomputer MPU. The limit torque TM*mmax is larger as the upper limit Vmax of the secondary voltage is higher, and is smaller as the upper limit Vmax is lower. In addition, the limit torque TM*mmax is larger as the rotation speed ω is lower, and is smaller as the rotation speed ω is higher.

The microcomputer includes therein a nonvolatile memory in which data TM*mmax from the limit torque table are written. In the course of a process in which an operating voltage is applied to the microcomputer to initialize the microcomputer itself and the motor drive system shown in FIG. 1, the data TM*mmax are read out from the nonvolatile memory to be written into the RAM. The microcomputer also includes a plurality of other similar look-up tables to be mentioned later. These look-up tables each also refer to a memory region in the RAM in which reference data read out from a nonvolatile memory are written, as with the limit torque table.

Secondary-Side Target Voltage Calculation—

In secondary-side target voltage calculation, the microcomputer of the motor control device 30m determines which of "power running" and "regeneration" is to be performed on the basis of the target torque T* and the rotation speed ω. The microcomputer reads out a secondary-side target voltage Vuc*m assigned to the rotation speed ω of the electric motor 10m from a secondary-side target voltage table assigned to the target torque T* in a "power running" group in the case where it is determined that "power running" is to be performed, or in a "regeneration" group in the case where it is determined that "regeneration" is to be performed.

Figure 4:
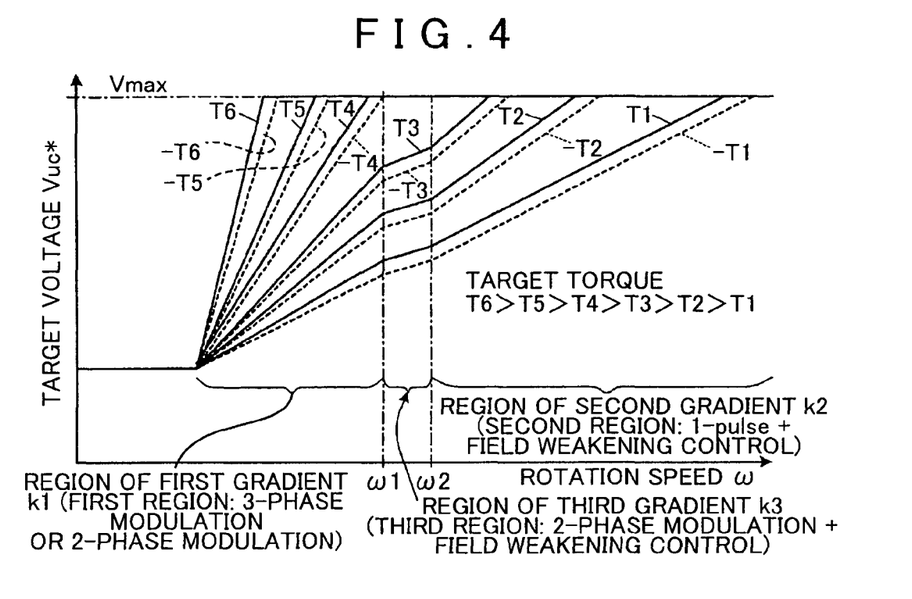
FIG. 4 is a graph showing an outline of secondary-side target voltage characteristics adopted in the present invention.

Each secondary-side target voltage table in the "power running" group is a look-up table that stores secondary-side target voltage values correlated with the rotation speed according to the secondary-side target voltage characteristics indicated by the solid lines in FIG. 4. Each secondary-side target voltage table in the "regeneration" group is a look-up table that stores secondary-side target voltage values correlated with the rotation speed according to the secondary-side target voltage characteristics indicated by the dotted lines in FIG. 4.

The secondary-side target voltage characteristics in a first region and in a high target torque region (T6 to T4) increase generally linearly with a steep gradient. Meanwhile, the secondary-side target voltage in a low target torque region (T3 to T1) increase with a steep first gradient k1 in accordance with an increase in the rotation speed ω with three-phase modulation (SVpwm) or two-phase modulation (Dpwm). The secondary-side target voltage characteristics are switched to a gentle third gradient k3 at a first rotation speed ω1, at which field weakening control is started. The secondary-side target voltage characteristics are then switched to a second gradient k2 different from the third gradient k3 at a second rotation speed ω2, at which the modulation mode, that is, the voltage control mode, is switched to a one-pulse mode in which rectangular-wave power is applied to all the phases.

The third region with the third gradient k3 is the region which has the large target torque and, among a high rotation speed region, is close to a low rotation speed region where the field weakening current is small. Further, in the third region, three-phase modulation or two-phase modulation is performed. Therefore, the torque control precision is high, and the power loss due to the field weakening current is small. The third gradient k3 is gentle, and therefore the amount of increase in the secondary-side target voltage with respect to the increase in the rotation speed is small. Thus, the margin for adjusting the secondary-side target voltage in the following one-pulse region is not reduced very much. The region with the third gradient k3 is followed by the one-pulse region, which increases the one-pulse region. The switching loss of the inverter is small in the one-pulse region. Therefore, the power loss is reduced by increasing the one-pulse region.

In this embodiment, two-phase modulation is performed in the third region ω1 to ω2 with the third gradient k3. Two-phase modulation incurs a smaller switching loss than that incurred by three-phase modulation, and thus effectively suppresses power consumption. Also in this embodiment, as shown in FIG. 4, the second gradient k2 in the second region is steeper than the third gradient k3 and smaller than the first gradient k1 in the first region. That is, the relationship k1>k2>k3 is established. Consequently, the rotation speed range in which the secondary-side target voltage reaches the upper limit Vmax is expanded to the high-speed side in a region at a low torque and a high rotation speed, enhancing a torque control region in which one-pulse secondary voltage control is performed. That is, the torque control function is enhanced in a region at a low torque and a high speed.

In the secondary-side target voltage characteristics for each target torque, the secondary-side target voltage Vuc*m is higher as the target torque is larger, and the third gradient k3 is larger as the target torque is larger.

The first gradient k1 is a value that sets a modulation ratio Mi=Vm*/Vuc*m, which is the ratio of an electric motor target voltage Vm* to the secondary-side target voltage Vuc*m of the converter 30c in PWM control (in this embodiment, two-phase modulation) before field weakening control is started, to 0.707 (first set value). The second gradient k2 is a value that sets the modulation ratio Mi in the one-pulse modulation mode to 0.78 (second set value). The third gradient k3 is a value that increases the secondary-side target voltage from a secondary voltage target value assigned to the first rotation speed ω1 to a secondary-side target voltage assigned to the second rotation speed ω2 in correspondence with an increase in the speed from the first rotation speed ω1 to the second rotation speed ω2 at the same target torque.

Figure 6:
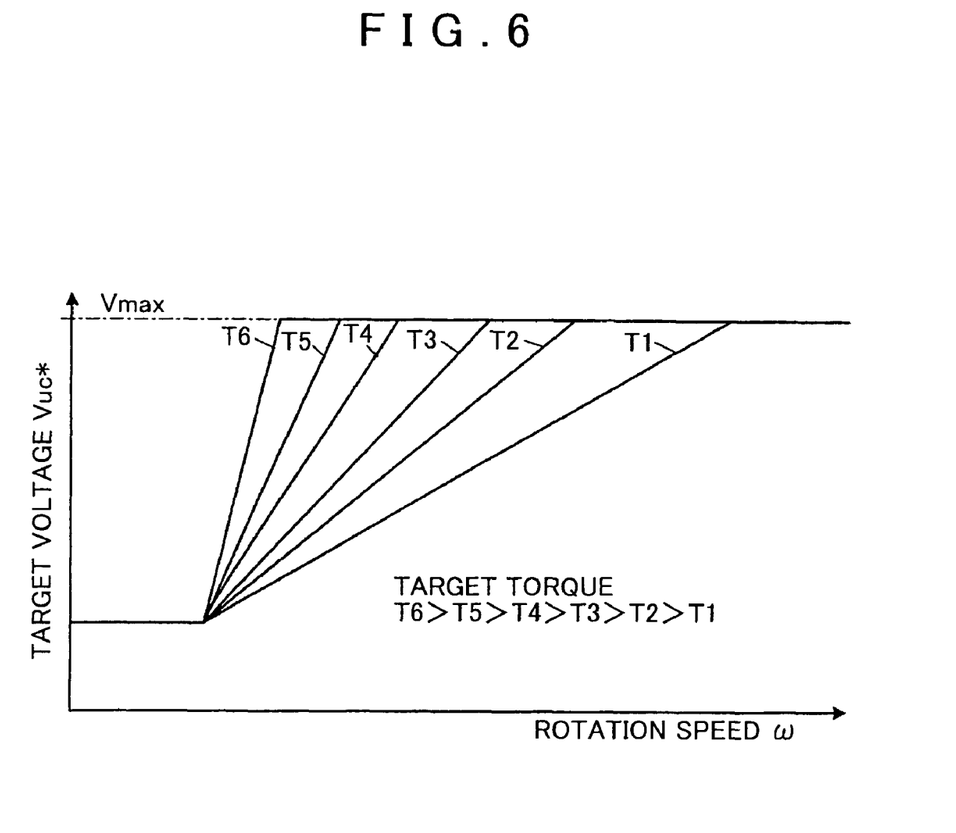
FIG. 6 is a graph showing an outline of secondary-side target voltage characteristics according to the related art.

In this embodiment, a d-axis current id* and a q-axis current iq* corresponding to the target torque in a d-q coordinate system are calculated on the basis of a high-torque curve. Target voltages vd*, vq* of the d-axis and q-axis are calculated on the basis of the calculated currents, and are converted into respective phase control voltages for the three phases. However, high-torque curves for "power running" and for "regeneration" are asymmetric to each other (the values of id* and iq* for target torque with the same absolute value are different from each other), and thus if it is assumed that a single type of secondary-side target voltage characteristics for each target torque as shown in FIG. 6 are commonly used for both "power running" and "regeneration", the torque control precision would be reduced. Thus, in this embodiment, the secondary-side target voltage characteristics for a target torques with the same absolute value are provided in two types, for "power running" and for "regeneration". In FIG. 4, the secondary-side target voltage characteristics for "power running" are indicated by the solid lines, and the secondary-side target voltage characteristics for "regeneration" are indicated by the broken line (dotted lines).

In the microcomputer of the motor control device 30m, the "output computation" 35 performs feedback control through vector control computation on a d-q axis model according to the related art in which the d-axis corresponds to the direction of a pair of magnetic poles in the rotor of the electric motor 10m and the q-axis corresponds to the direction perpendicular to the d-axis. Thus, the microcomputer digitally converts and reads the current detection signals iUm, iVm, iWm from the current sensors 14m to 16m. Current feedback computation converts the three-phase current values iUm, iVm, iWm in a fixed coordinate system into two-phase current values idm, iqm for the d-axis and the q-axis in a rotating coordinate system using three-phase/two-phase conversion, which is conversion of fixed coordinates into rotating coordinates according to the related art.

A first high-efficiency torque curve table A, which is a look-up table, is provided in the output computation 35. The first high-efficiency torque curve table A stores d-axis current values id that are correlated with the motor speed ωm and the motor target torque T*m and that are used to generate the target torque T*m at each motor speed, which are written into the first high-efficiency torque curve table A.

The output torque of the electric motor is set in correspondence with the respective values of the d-axis current id and the q-axis current iq. For one rotation speed value, that is, at the same motor rotation speed, there are an infinite number of combinations of id, iq for outputting the same torque, which are located on a constant torque curve. The efficiency of power use becomes highest (the power consumption becomes lowest) with a certain combination of id, iq on the constant torque curve, which is referred to as high-efficiency torque point. A curve obtained by connecting high-efficiency torque points on a plurality of torque curves is referred to as high-efficiency torque curve, and is provided for each rotation speed. The d-axis current id and the q-axis current iq at the position of a given motor target torque T*m on the high-efficiency torque curve for the rotation speed of the motor are set as target current values for biasing the electric motor 10m. This allows the electric motor 10m to output the target torque T*m, and such motor biasing results in a high efficiency of power use.

In this embodiment, the high-efficiency torque curve is divided into two systems: a first high-efficiency torque curve A representing d-axis values, and a second high-efficiency torque curve B representing q-axis values. The first high-efficiency torque curve A is a pair of curves which are respectively applicable to the power running region and the regeneration region and which each represent the d-axis target current for the motor rotation speed and the target torque.

The first high-efficiency torque curve table A is a memory region in which the d-axis target current for the target torque T*m for generating the target torque with the lowest power consumption is written. The first high-efficiency torque curve table A is formed by a pair of tables, namely a power running table A1 for power running and a regeneration table A2 for regeneration. It is determined which of power running and regeneration is to be performed on the basis of the rotation speed ωm of the electric motor and the given target torque T*m, and it is then determined which of the power running table and the regeneration table is to be used in accordance with the determination results.

An increase in the rotation speed ωm of the electric motor 10m increases counter electromotive forces generated in the stator coils 11 to 13, and hence the terminal voltages of the coils 11 to 13. This makes it increasingly difficult to supply a target current from the inverter 19m to the coils 11 to 13, and hinders obtaining a target torque output. In this case, it is possible to output the target torque T*m at a higher rotation speed by allowing the passage of a q-axis current iq which has been calculated to achieve the given motor target torque T*m and a d-axis current id which reduces a magnetic flux, although the efficiency of power use reduces. Such control is referred to as field weakening control. A d-axis field weakening current $\Delta id$ is generated by field adjustment margin computation to calculate a d-axis current command and a q-axis current command. The d-axis field weakening current $\Delta id$ is calculated by field weakening current computation 41. The content of the calculation will be described later.

In the calculation of the d-axis current command in the "output computation" 35, the microcomputer MPU calculates a d-axis target current id* by subtracting the d-axis field weakening current $\Delta id$ from the d-axis current value id, which is read out from the first high-efficiency torque curve table A in correspondence with the target torque T*m determined by the torque command limit as follows:

$$id^* = -id - \Delta id \qquad (1)$$

In the calculation of the q-axis current command, the second high-efficiency torque curve table B in the output computation 35 is used. The second high-efficiency torque curve table B is obtained by correcting the second high-efficiency torque curve B representing the q-axis values, of the high-efficiency torque curves, into a curve representing the q-axis target current from which a q-axis field weakening current $\Delta iq$ paired with the d-axis field weakening current $\Delta id$ has been subtracted, and storing data of the corrected second high-efficiency torque curve B in a table.

The second high-efficiency torque curve table B is a memory region in which the d-axis target current for generating the target torque with the lowest power consumption, that is, the target current values on the corrected second high-efficiency torque curve B, for the target torque T*m and the d-axis field weakening current Δid. The second high-efficiency torque curve table B is also formed by a pair of a power running table B1 for power running and a regeneration table B2 for regeneration. It is determined which of power running and regeneration is to be performed on the basis of the rotation speed ωm of the electric motor and the target torque T*m, and it is then determined which of the power running table and the regeneration table is used in accordance with the determination results.

In the calculation of the q-axis current command, a q-axis target current iq* for the target torque T*m and the d-axis field weakening current Δid is read out from the second high-efficiency torque curve table B, and is set as a q-axis current command.

In the microcomputer of the motor control device 30m, the output computation 35 calculates a current deviation δid between the d-axis target current id* and the d-axis current id and a current deviation δiq between the q-axis target current iq* and the q-axis current iq to perform proportional and integral control (PI computation through feedback control) on the basis of the current deviations δid, δiq. That is, the output computation 35 calculates a voltage drop Vzdp representing a voltage command value of a proportional component and a voltage drop Vzdi representing a voltage command value of an integral component on the basis of the current deviation δid, and adds the voltage drops Vzdp, Vzdi to each other to calculate a voltage drop Vzd, as follows:

$$Vzd = Vzdp + Vzdi \tag{2}$$

The output computation 35 also reads the rotation speed ω and the q-axis current iq to calculate an induced voltage ed induced by the q-axis current iq on the basis of the rotation speed ω, the q-axis current iq, and a q-axis inductance Lq, as follows:

$$ed = \omega m \cdot Lq \cdot iq \tag{3}$$

The output computation 35 subtracts the induced voltage ed from the voltage drop Vzd to calculate a d-axis voltage command value vd* as an output voltage, as follows:

$$\begin{aligned}vd^* &= Vzd - ed \\ &= Vzd - \omega m \cdot Lq \cdot iq\end{aligned} \tag{4}$$

The output computation 35 further calculates a voltage drop Vzqp representing a voltage command value of a proportional component and a voltage drop Vzqi representing a voltage command value of an integral component on the basis of the current deviation δiq, and adds the voltage drops Vzqp, Vzqi to each other to calculate a voltage drop Vzq, as follows:

$$Vzq = Vzqp + Vzqi$$

The output computation 35 further calculates an induced voltage eq induced by the d-axis current id on the basis of the rotation speed ω, a counter electromotive voltage constant MIf, the d-axis current id, and a d-axis inductance Ld, as follows:

$$eq = \omega m(MIf + Ld \cdot id) \tag{5}$$

The output computation 35 adds the induced voltage eq to the voltage drop Vzq to calculate a q-axis voltage command value vq* as an output voltage, as follows:

$$\begin{aligned}vq^* &= Vzq + eq \\ &= Vzq + \omega m(MIf + LD \cdot id)\end{aligned} \tag{6}$$

Next, two-phase/three-phase conversion 36, which is conversion of rotating coordinates into fixed coordinates, converts the target voltages Vd* and Vq* in a rotating coordinate system into phase target voltages VU*, VV*, VW* in a fixed coordinate system in accordance with two-phase/three-phase conversion. When the voltage control mode is three-phase modulation, the phase target voltages VU*, VV*, VW* are provided to a PWM pulse generator 50 via modulation 37. When the voltage control mode is two-phase modulation, the phase target voltages VU*, VV*, VW* in the three-phase modulation mode are converted into those for the two-phase modulation mode by two-phase modulation 38 of the modulation 37, which are provided to the PWM pulse generator 50. When the voltage control mode is the one-pulse mode in which rectangular-wave power is applied to all the phases, the phase target voltages VU*, VV*, VW* in the three-phase modulation mode are converted into those for application of rectangular-wave power to all the phases by one-pulse conversion of the modulation 37, which are provided to the PWM pulse generator 50.

When the three-phase target voltages VU*, VV*, VW* are provided, the PWM pulse generator 50 converts the provided voltage values into PWM pulses MUm, MVm, MWm for outputting the voltage of each value at a frequency (carrier frequency) in sync with clocks at a low frequency (5 KHz) or a high frequency (7.5 KHz) provided by a carrier clock generator 46 to output the resulting pulses to the drive circuit 20m shown in FIG. 1. The drive circuit 20m generates six parallel drive signals on the basis of the PWM pulses MUm, MVm, MWm, and respectively turns on and off the transistors Tr1 to Tr6 of the voltage inverter 19m in response to the drive signals. This allows VU*, VV*, and VW* to be respectively applied to the stator coils 11 to 13 of the electric motor 10m, and allows the phase currents iUm, iVm, and IWm to flow. When the phase target voltages for the two-phase modulation mode are provided, the PWM pulse generator generates PWM pulses for two phases, and generates an on or off (constant voltage output) signal for the remaining phase. When the phase target voltages for the one-pulse modulation mode are provided, an energization section signal for applying rectangular-wave power to the respective phases is output.

Field weakening current computation 41 calculates an effective modulation rate saturation index m, which is a parameter for field weakening control. That is, the saturation determination index m is calculated as a value representing the degree of voltage saturation on the basis of the d-axis voltage command value vd* and the q-axis voltage command value vq*, as follows:

$$m = \sqrt{(vd^{*2} + vq^{*2})}/Vuc \tag{7}$$

A maximum modulation ratio threshold kv is subtracted from the effective modulation rate determination index m to calculate a modulation rate deviation calculation value ΔM as follows, calculating a field adjustment margin:

$$\Delta M = m - kv \tag{9}$$

The maximum modulation ratio threshold kv is calculated on the basis of the voltage Vuc of the secondary-side condenser 23 (voltage detection value of the current sensor 24) and the rotation speed ωm of the electric motor.

In the calculation of the field adjustment margin, ΔM is integrated. In the case where an integrated value ΣΔM is positive, the integrated value ΣΔM is multiplied by a proportional coefficient to calculate a positive d-axis field weakening current Δid for performing field weakening control. In the case where the modulation rate deviation calculation value ΔM or the integrated value ΣΔM is zero or less, the adjustment value Δid and the integrated value ΣΔV are set to zero. The adjustment value Δid is used in the calculation of the d-axis current command and the q-axis current command.

The "two-phase/three-phase conversion" 36 calculates an electric motor target voltage Vm* in the course of two-phase/three-phase conversion. The relationship Vm*=√(vd*² + vq*²) is established. Modulation ratio calculation 43 of modulation control 42 calculates the modulation ratio Mi on the basis of the electric motor target voltage Vm* and the voltage Vuc of the secondary-side condenser 23 (voltage detection value of the current sensor 24), as follows:

$$Mi = Vm^*/Vuc^*m \qquad (10)$$

Modulation mode determination 44 determines the modulation mode on the basis of the target torque T* and the rotation speed ω of the electric motor 10m and the modulation ratio Mi. The modulation mode determination 44 commands selection 40 in the modulation 37 to output the phase target voltages in accordance with the determined modulation mode.

The microcomputer MPU shown in FIG. 2 includes, in addition to a CPU, a RAM, a ROM, and a flash memory that store data and various programs. Programs, reference data, and look-up tables stored in the ROM or the flash memory are written into the RAM to perform an input process, a computation, and an output process indicated by a block surrounded by the double-dashed lines in FIG. 2 on the basis of the programs.

Figure 3:
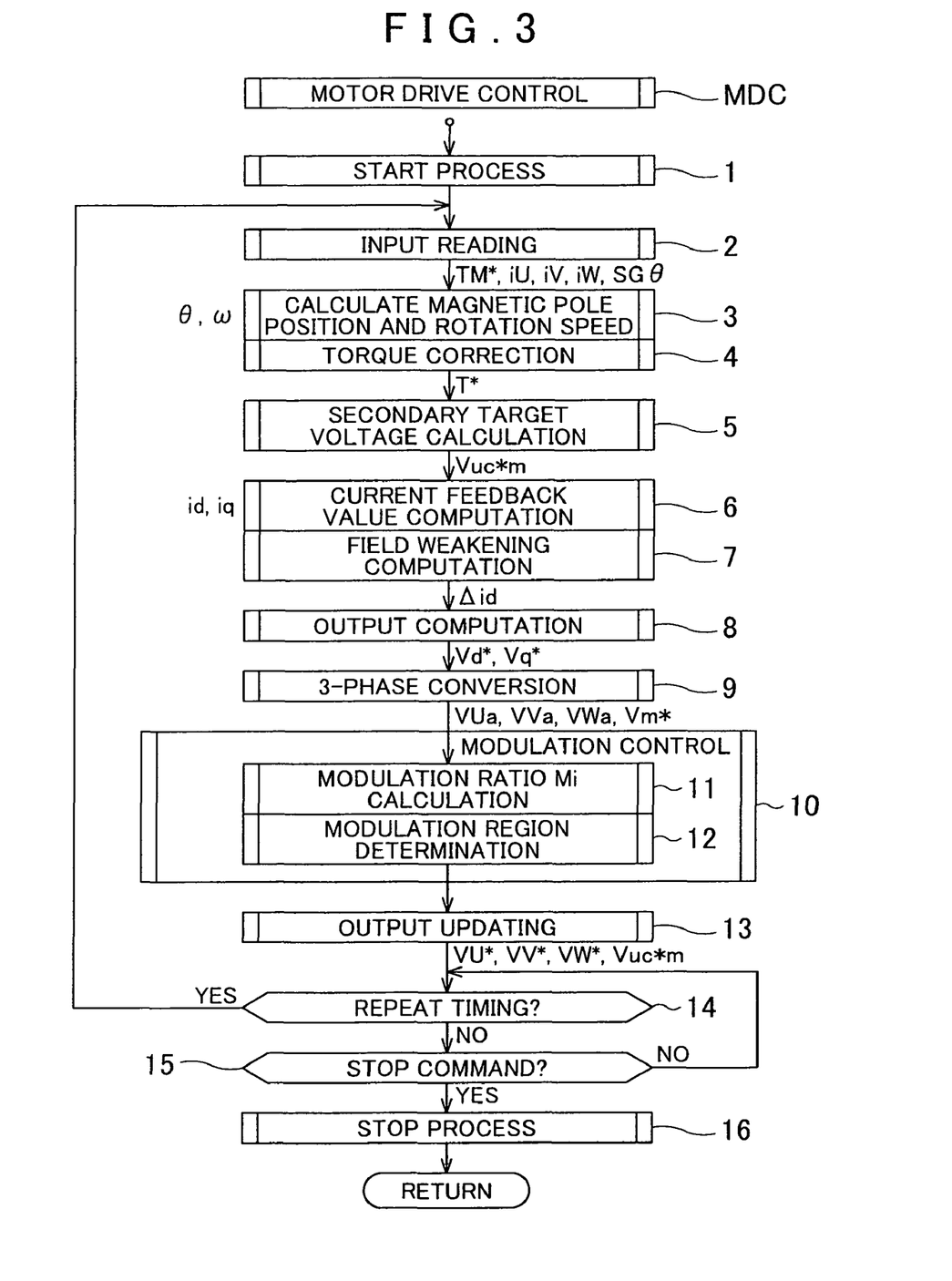
FIG. 3 is a flowchart showing an outline of motor control performed by a microcomputer MPU shown in FIG. 2.

FIG. 3 shows an outline of motor drive control MDC executed by (the CPU of) the microcomputer MPU on the basis of the programs. When an operating voltage is applied, the microcomputer MPU initializes itself, the PWM pulse generator 50, the carrier clock generator 46, and the drive circuit 20m, and sets the inverter 19m which drives the electric motor 10m to a stationary waiting state. The microcomputer MPU waits for a motor drive start command from the main controller of the vehicle running control system (not shown). When a motor drive start command is provided, the microcomputer MPU sets initial values for electric motor control in an internal register in "start process" (step 1), and reads input signals or data in "input reading" (step 2). That is, the microcomputer MPU reads through digital conversion a first target torque TM*m provided by the main controller, respective phase current values iU, iV, iW detected by the current sensors 14m to 16m, and the rotation angle signal SGθm from the resolver 17m.

In the parentheses below, only the number of the step is given with the term "step" omitted.

Next, the microcomputer MPU calculates a rotation angle θ and a rotation speed ω on the basis of the read rotation angle signal SGθ (rotation angle data SGθ) (3). This function is indicated as angle/speed computation 32 in FIG. 2. Next, the microcomputer MPU reads out from a limit torque table a limit torque TM*max corresponding to the read motor target torque TM*, the read DC voltage Vuc, and the calculated rotation speed ω. If the read motor target torque TM* exceeds TM*max, TM*max is set as a target torque T. If the read motor target torque TM* is equal to or less than TM*max, the motor target torque TM* is set as a target torque T* (4). This function is indicated as torque command limit 34 in FIG. 2.

Next, in "secondary-side target voltage calculation" (5), the microcomputer MPU determines which of a "power running" operation and a "regeneration" operation is to be performed by the electric motor 10m, and selects a group in correspondence with the determination results. The microcomputer MPU then reads out a secondary-side target voltage Vuc*m assigned to the current rotation speed ω from a secondary-side target voltage table correlated with the target torque T* for the selected group. The content of the "secondary-side target voltage calculation" (5) is the same as the content of the secondary-side target voltage calculation discussed above. Next, the microcomputer MPU converts the read three-phase current detection signals iU, IV, iW into two-phase d-axis current value id and q-axis current value through three-phase/two-phase conversion (6). This function is indicated as current feedback 31 in FIG. 2. Next, the microcomputer MPU calculates a d-axis field weakening current Δid for performing d-axis field weakening control (7). This function is indicated as field weakening current computation 41 in FIG. 2.

The content of the "output computation" (8) is the same as the content of the output computation 35 shown in FIG. 2 discussed above. The d-axis and q-axis voltage target values vd*, vq* calculated in the "output computation" (8) are converted into phase target voltages VU*, VV*, VW* for the three-phase modulation mode (9). An electric motor target voltage Vm* is also calculated at this time. In the following "modulation control" (10), a modulation ratio Mi is calculated (11), and a modulation mode is determined on the basis of the modulation ratio Mi, the target torque T*, and the rotation speed ω (12).

Figure 5:
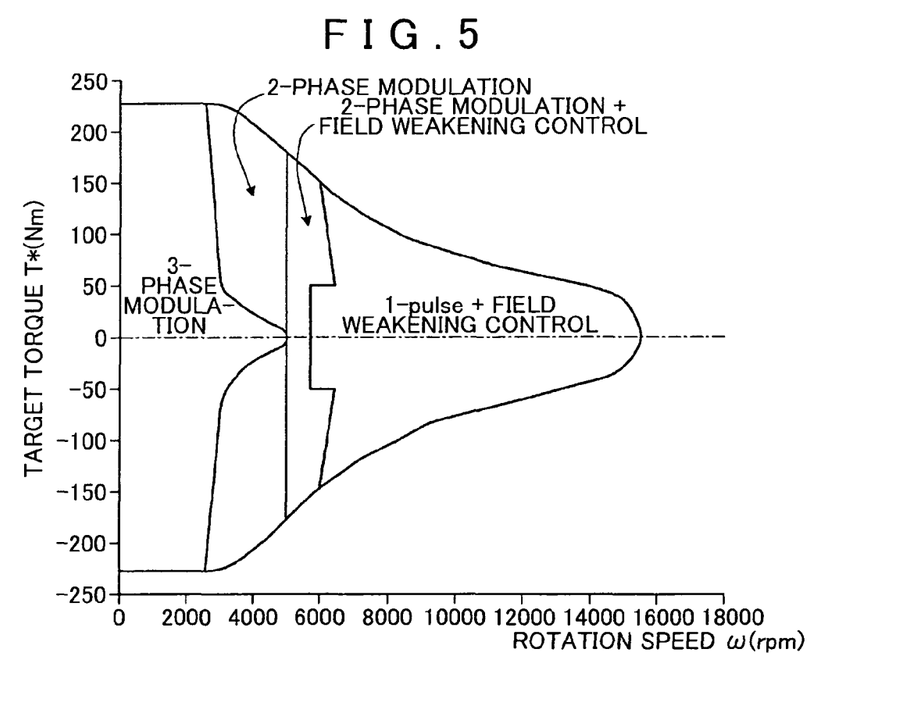
FIG. 5 is a graph showing the distribution of voltage control modes.

FIG. 5 shows an outline of the classification of modulation modes. While the target torque T* and the rotation speed ω are indicated as parameters in FIG. 5, the modulation ratio Mi may also be used as a parameter. The microcomputer MPU has modulation threshold tables (look-up tables) correlated with the modulation mode (three-phase modulation, two-phase modulation, one-pulse) and the modulation ratio. Each modulation threshold table stores thresholds (target torque values and rotation speed values) on the boundaries between the modulation modes. In "modulation region determination" (12), the microcomputer MPU selects a modulation threshold table corresponding to the current modulation mode (three-mode modulation, two-mode modulation, or one-pulse) and modulation ratio to read out thresholds from the selected modulation threshold table. The microcomputer MPU compares the target torque T* and the rotation speed with the thresholds to determine which of the modulation modes is to be adopted next.

In the following "output updating" (13), the phase target voltages for the modulation mode determined in the modulation control (10) are output to the PWM pulse generator 50. Next, the process waits for arrival of a next repetition process timing (14), and proceeds again to the "input reading" (2). Then, the processes in and after the "input reading" (2) discussed above are executed. In the case of receiving a stop command from a system controller while waiting for arrival of a next repetition process timing, the microcomputer MPU stops the output for biasing the motor rotation (15, 16).

The control function of the motor control device 30m which controls an operation of the electric motor 10m which rotationally drives wheels has been described above.

FIG. 1 is referred to again. An electric motor 10g which is rotationally driven by an on-vehicle engine is occasionally referred to as generator or dynamotor. In this embodiment, however, the electric motor 10g is an electric motor (power running) that starts the engine when the engine is to be started, and is a generator (regeneration) that is rotationally driven by the engine to generate power once the engine is started. The function and the operation of a motor control device 30g that controls the electric motor 10g are the same as those of the motor control device 30m. Also, the configuration and the operation of an inverter 19g that supplies power to the electric motor 10g are the same as those of the inverter 19m. The configuration and the function of the motor control device 30g are the same as those of the motor control device 30m.

When the engine is to be started, the motor control device 30g receives a positive target torque TM*g from the main controller (not shown) to perform a control operation similar to the control operation discussed above performed by the motor control device 30m. Once the engine is started and an output torque of the engine increases, the main controller switches the target torque TM*g to a negative value for generation (regeneration). This causes the motor control device 30g to control the inverter 19g such that the output torque of the electric motor 10g becomes the target torque (target load on the engine) with the negative value. The content of the computation (output control computation) is also the same as the output control computation discussed above performed by the motor control device 30m.

In this embodiment, a converter control device 30v shown in FIG. 1 is also an electronic control unit that includes a microcomputer as its main component. The converter control device 30v includes the microcomputer, interfaces (signal processing circuits, not shown), and a PWM pulse generator, and further includes interfaces (communication circuits, not shown) between the microcomputer and the main controller of the vehicle running control system (not shown) in the vehicle.

The motor control device 30g calculates a rotation angle (magnetic pole position) θg and a rotation speed (angular speed) ωg of the rotor of the electric motor 10g on the basis of a rotation angle signal SGθg provided by a resolver 17g. The motor control device 30g then determines a secondary-side target voltage Vuc*g (second secondary-side target voltage Vuc*g) on the basis of the target torque TM*g and the rotation speed ωg. Because the torque becomes low and the rotation speed becomes high only in rare cases, the secondary-side target voltage Vuc*g is determined such that a first region in which field weakening control is not performed is set up to the maximum voltage of the converter, and such that field weakening control is started after the secondary-side target voltage Vuc*g reaches the maximum voltage of the converter, unlike the secondary-side target voltage table for the motor control device 30m. This hinders performing field weakening control during low-speed rotation and mid-speed rotation, which improves the efficiency by improving the efficiency of power use. In the case where it is necessary to improve the efficiency during high-speed rotation as with the electric motor 10m, however, the secondary-side target voltage Vuc*g may be determined on the basis of a secondary-side target voltage table with characteristics similar to those of the secondary-side target voltage table for the motor control device 30m. The converter control device 30v reads the secondary-side target voltage Vuc*m provided by the motor control device 30m (first secondary-side target voltage Vuc*m) and the secondary-side target voltage Vuc*g provided by the motor control device 30g (second secondary-side target voltage Vuc*g), and also reads the battery voltage Vdc, secondary voltage Vuc detected by the sensors 21, 24 through digital conversion. The converter control device 30v then determines a higher one of the first secondary-side target voltage Vuc*m and the second secondary-side target voltage Vuc*g as the target voltage Vuc*, generates a PWM signal Pvf for controlling turning on/off of a voltage increasing switching element 42 and a PWM signal Pvr for controlling turning on/off of a regeneration (voltage reducing) switching element 43 such that the voltage Vuc detected by the current sensor 24 becomes the target voltage Vuc*, and provides the generated PWM signals to a drive circuit 20v. The drive circuit 20v turns on and off the semiconductor switches 26, 27 on the basis of the PWM signals Pvf, Pvr. When it is necessary to increase the voltage, the voltage increasing switching element 42 of the converter 30c is turned on and off through PWM control. When it is necessary to reduce the voltage, the regeneration switching element 43 is turned on and off through PWM control. The voltage increasing semiconductor switch 26 and the regeneration semiconductor switch 27 are switched in a complementary manner such that the former is on while the latter is off and the former is off while the latter is on.

The invention claimed is:

1. An electric motor control device comprising:
   an inverter that supplies an output of a primary-side DC power supply to an electric motor to control driving of the electric motor;
   a converter that includes a voltage increasing power supply device that increases a voltage of the primary-side DC power supply to supply the inverter with the increased voltage as a secondary voltage, and a regenerative power supply device that reversely supplies regenerative power from the inverter to the primary-side DC power supply;
   a secondary-side target voltage determination unit that determines a secondary-side target voltage such that the electric motor is driven on the basis of one of a first region in a modulation mode in which PWM power is applied to at least two phases and in which field weakening control is not performed, a third region in a modulation mode in which PWM power at a voltage lower than a maximum voltage of the converter is applied to at least two phases and in which field weakening control is performed, and a second region in a one-pulse mode in which rectangular-wave power at a voltage lower than the maximum voltage of the converter is applied to all phases and in which field weakening control is performed;
   a converter control unit that controls the voltage increasing power supply unit and the regenerative power supply unit of the converter such that the secondary voltage becomes the secondary-side target voltage; and
   an electric motor control unit that controls the inverter on the basis of a target torque and a rotation speed of the electric motor and the secondary voltage such that an output torque of the electric motor becomes the target torque.

2. The electric motor control device according to claim 1, wherein
   the secondary-side target voltage determination unit increases the secondary-side target voltage in accordance with an increase in the target torque of the electric motor in the second region.

3. The electric motor control device according to claim 2, wherein
   the secondary-side target voltage determination unit determines the secondary-side target voltage on the basis of secondary-side target voltage characteristics for each target torque of the electric motor in which the secondary-side target voltage increases with a first gradient in accordance with an increase in the rotation speed of the electric motor in the first region, increases with a third gradient different from the first gradient in the third region at the rotation speed of the electric motor equal to or higher than a first rotation speed at which field weakening control is started, and increases with a second gradient different from the third gradient in the second region at the rotation speed of the equal to or higher than a second rotation speed at which the modulation mode is switched to the one-pulse mode.

4. The electric motor control device according to claim 3, wherein
the first gradient is larger than the third gradient, and the second gradient is larger than the third gradient.

5. The electric motor control device according to claim 4, wherein
the second gradient is smaller than the first gradient.

6. The electric motor control device according to claim 5, wherein
the electric motor control unit switches the modulation mode to two-phase modulation in a speed region with the third gradient.

7. The electric motor control device according to claim 3, wherein
the secondary-side target voltage increases as the target torque is larger in the secondary-side target voltage characteristics.

8. The electric motor control device according to claim 3, wherein
the third gradient is larger as the target torque is larger.

9. The electric motor control device according to claim 3, wherein
the first gradient is determined on the basis of a modulation ratio which is a ratio of the target voltage of the electric motor to the secondary voltage of the converter during three-phase modulation or two-phase modulation before field weakening control is started.

10. The electric motor control device according to claim 9, wherein
the second gradient is determined on the basis of a modulation ratio which is a ratio of the target voltage of the electric motor to the secondary voltage of the converter in the one-pulse modulation mode.

11. The electric motor control device according to claim 10, wherein
the modulation ratio which is the ratio of the target voltage of the electric motor to the secondary voltage of the converter during the three-phase modulation or the two-phase modulation is smaller than the modulation ratio which is the ratio of the electric motor target voltage to the secondary voltage of the converter.

12. A drive device comprising:
the electric motor control device according to claim 1; and
an electric motor to which power is supplied by the inverter of the electric motor control device, and which drives wheels.

13. An electric motor control device comprising:
an inverter that supplies an output of a primary-side DC power supply to an electric motor to control driving of the electric motor;
a converter that includes a voltage increasing power supply device that increases a voltage of the primary-side DC power supply to supply the inverter with the increased voltage as a secondary voltage, and a regenerative power supply device that reduces a voltage of regenerative power from the inverter to reversely supply the reduced voltage to the primary-side DC power supply;
a secondary-side target voltage determination unit that derives a secondary-side target voltage on the basis of secondary-side target voltage characteristics for each target torque of the electric motor in which the secondary-side target voltage increases with a first gradient in accordance with an increase in a rotation speed of the electric motor in a modulation mode in which PWM power is applied to at least two phases, is switched to increase with a third gradient different from the first gradient at a first rotation speed at which field weakening control is started, and is switched to increase with a second gradient different from the third gradient at a second rotation speed at which the modulation mode is switched to a one-pulse mode in which rectangular-wave power is applied to all phases, up to a maximum voltage of the converter;
a converter control unit that controls the voltage increasing power supply unit and the regenerative power supply unit of the converter such that the secondary voltage becomes the secondary-side target voltage; and
an electric motor control unit that controls the inverter on the basis of the target torque and the rotation speed of the electric motor and the secondary voltage such that an output torque of the electric motor becomes the target torque.

14. The electric motor control device according to claim 13, wherein
the first gradient is larger than the third gradient, and the second gradient is larger than the third gradient.

15. The electric motor control device according to claim 14, wherein
the second gradient is smaller than the first gradient.

16. The electric motor control device according to claim 15, wherein
the electric motor control unit switches the modulation mode to two-phase modulation in a speed region with the third gradient.

17. The electric motor control device according to claim 13, wherein
the secondary-side target voltage increases as the target torque is larger in the secondary-side target voltage characteristics.

18. The electric motor control device according to claim 13, wherein
the third gradient is larger as the target torque is larger.

19. The electric motor control device according to claim 13, wherein
the first gradient is determined on the basis of a modulation ratio which is a ratio of the target voltage of the electric motor to the secondary voltage of the converter during three-phase modulation or two-phase modulation before field weakening control is started.

20. The electric motor control device according to claim 19, wherein
the second gradient is determined on the basis of a modulation ratio which is a ratio of the target voltage of the electric motor to the secondary voltage of the converter in the one-pulse modulation mode.

21. The electric motor control device according to claim 20, wherein
the modulation ratio which is the ratio of the target voltage of the electric motor to the secondary voltage of the converter during the three-phase modulation or the two-phase modulation is smaller than the modulation ratio which is the ratio of the electric motor target voltage to the secondary voltage of the converter.

22. The electric motor control device according to claim 13, wherein
with the third gradient, the secondary voltage target value assigned to the first rotation speed is increased to the secondary-side target voltage assigned to the second rotation speed in correspondence with a speed increase from the first rotation speed to the second rotation speed at the same target torque.

23. The electric motor control device according to claim 13, wherein
the secondary-side target voltage characteristics for power running and the secondary-side target voltage characteristics for regeneration are provided for the same target torque, and the secondary-side target voltage determination unit determines which of "power miming" and "regeneration" is to be performed on the basis of the target torque and the rotation speed to derive the secondary-side target voltage corresponding to the rotation speed of the electric motor on the basis of the secondary-side target voltage characteristics for power running in the case where it is determined that "power running" is to be performed and on the basis of the secondary-side target voltage characteristics for regeneration in the case where it is determined that "regeneration" is to be performed.

24. A drive device comprising:
the electric motor control device according to claim 13; and
an electric motor to which power is supplied by the inverter of the electric motor control device, and which drives wheels.

25. A hybrid drive device comprising:
a first electric motor that drives wheels;
a second electric motor rotationally driven by a fuel engine;
a first inverter that supplies an output of a primary-side DC power supply to the first electric motor to control driving of the first electric motor;
a second inverter that supplies the output of the primary-side DC power supply to the second electric motor to control driving of the second electric motor;
a converter that includes a voltage increasing power supply device that increases a voltage of power of the primary-side DC power supply to supply the first and second inverters with the increased voltage, and a regenerative power supply device that reversely supplies regenerative power from the first and second inverters to the primary-side DC power supply;
a first secondary-side target voltage determination unit that determines a first secondary-side target voltage such that the first electric motor is driven on the basis of one of a first region in a modulation mode in which PWM power is applied to at least two phases and in which field weakening control is not performed, a third region in a modulation mode in which PWM power at a voltage lower than a maximum voltage of the converter is applied to at least two phases and in which field weakening control is performed, and a second region in a one-pulse mode in which rectangular-wave power at a voltage lower than the maximum voltage of the converter is applied to all phases and in which field weakening control is performed;
a second secondary-side target voltage determination unit that derives the second secondary-side target voltage suitable for an efficient operation of the second electric motor, in accordance with a target torque and a rotation speed of the second electric motor;
a converter control unit that controls the voltage increasing power supply unit and the regenerative power supply unit of the converter such that a secondary voltage supplied to the first and second inverters by the converter becomes a higher one of the first secondary-side target voltage and the second secondary-side target voltage;
a first motor control unit that controls the first inverter on the basis of a target torque and a rotation speed of the first electric motor and the secondary voltage such that an output torque of the first electric motor becomes the target torque; and
a second motor control unit that controls the second inverter on the basis of the target torque and the rotation speed of the second electric motor and the secondary voltage such that an output torque of the second electric motor becomes the target torque.

26. A hybrid drive device comprising:
a first electric motor that drives wheels;
a second electric motor rotationally driven by a fuel engine;
a primary-side DC power supply;
a first inverter that supplies an output of the primary-side DC power supply to the first electric motor to control driving of the first electric motor;
a second inverter that supplies the output of the primary-side DC power supply to the second electric motor to control driving of the second electric motor;
a converter that includes a voltage increasing power supply device that increases a voltage of power of the primary-side DC power supply to supply the first and second inverters with the increased voltage, and a regenerative power supply device that reversely supplies regenerative power from the first and second inverters to the primary-side DC power supply;
a first secondary-side target voltage determination unit that derives a first secondary-side target voltage on the basis of secondary-side target voltage characteristics for each target torque of the first electric motor in which the secondary-side target voltage increases with a first gradient in accordance with an increase in a rotation speed of the first electric motor in a modulation mode in which PWM power is applied to at least two phases, is switched to increase with a third gradient smaller than the first gradient at a first rotation speed at which field weakening control is started, and is switched to increase with a second gradient larger than the third gradient at a second rotation speed at which the modulation mode is switched to a one-pulse mode in which rectangular-wave power is applied to all phases, up to a maximum voltage of the converter;
a second secondary-side target voltage determination unit that derives the second secondary-side target voltage suitable for an efficient operation of the second electric motor, in accordance with a target torque and a rotation speed of the second electric motor;
a converter control unit that controls the voltage increasing power supply unit and the regenerative power supply unit of the converter such that a secondary voltage supplied to the first and second inverters by the converter becomes a higher one of the first secondary-side target voltage and the second secondary-side target voltage;
a first motor control unit that controls the first inverter on the basis of the target torque and the rotation speed of the first electric motor and the secondary voltage such that an output torque of the first electric motor becomes the target torque; and
a second motor control unit that controls the second inverter on the basis of the target torque and the rotation speed of the second electric motor and the secondary voltage such that an output torque of the second electric motor becomes the target torque.

* * * * *